(12) United States Patent
Puma (10) Patent No.: US 7,643,572 B2
(45) Date of Patent: Jan. 5, 2010

(54) MODULATOR WITH CONTROLLED TRANSMISSION BANDWIDTH, AND A CORRESPONDING METHOD FOR CONTROLLING THE TRANSMISSION BANDWIDTH

(75) Inventor: Giuseppe Li Puma, Bochum (DE)

(73) Assignee: Infineon Technologies AG, Neubiberg (DE)

( * ) Notice: Subject to any disclaimer, the term of this patent is extended or adjusted under 35 U.S.C. 154(b) by 595 days.

(21) Appl. No.: 11/251,514

(22) Filed: Oct. 14, 2005

(65) Prior Publication Data

US 2006/0088126 A1    Apr. 27, 2006

(30) Foreign Application Priority Data

Oct. 15, 2004    (DE) .................. 10 2004 050 411

(51) Int. Cl.
*H04L 27/00* (2006.01)
(52) U.S. Cl. ............... 375/295; 375/376; 375/354; 375/336; 375/130; 332/128; 341/143
(58) Field of Classification Search .......... 375/295, 375/376, 354, 336, 130; 332/128; 341/143
See application file for complete search history.

(56) References Cited

U.S. PATENT DOCUMENTS

| 4,313,209 | A | 1/1982 | Drucker ............ 455/112 |
|---|---|---|---|
| 6,504,498 | B1* | 1/2003 | O'Brien ............ 341/143 |
| 2003/0039330 | A1* | 2/2003 | Castiglione et al. ......... 375/376 |
| 2003/0118143 | A1* | 6/2003 | Bellaouar et al. ........... 375/376 |
| 2004/0012448 | A1* | 1/2004 | Bonhaus et al. ............ 331/17 |
| 2005/0185749 | A1* | 8/2005 | Convent et al. ........... 375/376 |
| 2006/0049878 | A1* | 3/2006 | Kawabe et al. ............ 331/16 |

OTHER PUBLICATIONS

Perrott, Michael Henderson; "Techniques for High Data Rate Modulation and Low Power Operation of Fractional-N Frequency Synthesizers"; Thesis Doctor of Philosophy in Electrical Engineering and Computer Science; Massachusetts Institute of Technology; pp. 125-154, Sep. 1997.
Riley, T.A., et al.; "A Simplified Continuous Phase Modulator Technique"; IEEE Transactions on Circuits and Systems II: Analog and Digital Signal Processing; vol. 41, No. 4; pp. 321-328, May 1994.

* cited by examiner

*Primary Examiner*—Chieh M Fan
*Assistant Examiner*—Zewdu Kassa
(74) *Attorney, Agent, or Firm*—Dicke, Billig & Czaja, PLLC (57) ABSTRACT

The modulator according to the invention is based on the modulation of a PLL, with the bandwidth of the PLL being variable. The modulator also has a means (14, 15) for determination of a signal ($\phi_r(kT_s)$; FDEV) which is characteristic of the modulation shift of the modulated signal. Furthermore, the modulator contains a comparison means (16) for comparison of this signal with a signal ($\phi(kT_s+\tau)$; FDEVNOM) which is characteristic of the nominal modulation shift, as well as a means (18) for variation of the bandwidth as a function of the output signal from the comparison means (16).

17 Claims, 5 Drawing Sheets

MODULATOR WITH CONTROLLED TRANSMISSION BANDWIDTH, AND A CORRESPONDING METHOD FOR CONTROLLING THE TRANSMISSION BANDWIDTH

CROSS-REFERENCE TO RELATED APPLICATIONS

This application claims priority from German Patent Application No. 10 2004 050 411.3, which was filed on Oct. 15, 2004, and is incorporated herein by reference in its entirety.

TECHNICAL FIELD

The invention relates to a modulator for a transmitter for a digital communication system, which is based on a phase locked loop (PLL) which can be modulated. The invention also relates to a method for adjustment of a modulator such as this.

BACKGROUND

Modern modulators for phase or frequency modulation and which are used in transmitters for digital communication systems are frequently based on the principle of direct modulation of a frequency synthesizer, which is in turn in the form of a PLL.

Figure 1:
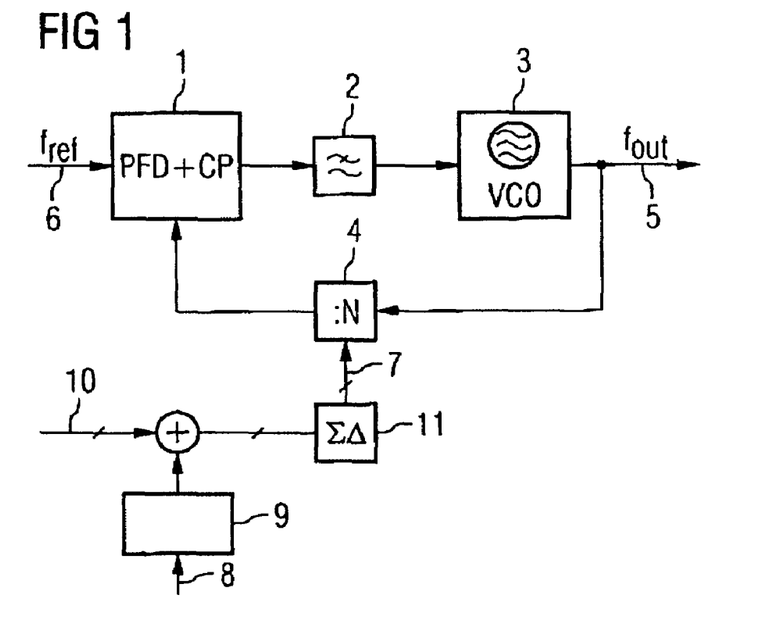
FIG. 1 shows a circuit diagram of a sigma-delta fractional N modulator according to the prior art.

FIG. 1 shows one typical version of a modulator such as this, which is described in the publication "A simplified continuous phase modulator technique" by T. A. Riley et al., IEEE Transactions on Circuits and Systems II: Analog and Digital Signal Processing, Vol. 41, No. 4, pages 321-328, May 1994. The essence of the modulator is a PLL which acts as a frequency synthesiser and has a closed control loop which includes a phase frequency detector 1 with a charge pump, a loop filter 2, a voltage controlled oscillator 3 (VCO) and a frequency divider 4 whose division ratio is variable.

During steady-state operation in the PLL, the frequency $f_{out}$ of the signal at the output 5 of the PLL is:

$$f_{out} = N \cdot f_{ref} \qquad (1)$$

In this case, $f_{ref}$ describes the frequency of the signal at the reference frequency input 6, and N describes the division ratio of the frequency divider 4.

For modulation of the PLL, the PLL has a modulation input 7 via which the division ratio N of the frequency divider 4 can be varied. A modulator such as this with only one modulation input is also referred to as a one-point modulator. When the division ratio N is varied, the frequency $f_{out}$ of the signal at the output 5 varies in accordance with equation 1. A circuit as illustrated in FIG. 1 can thus be used to produce frequency modulation as well as phase modulation (since the frequency and phase are linked via the integral).

In order to drive the modulation input 7, a digital (in this case: binary) modulation data signal 8 is modulated by means of a digital pulse shaping filter 9. The pulse shaping filter 9 is used to increase the spectral efficiency of the modulation signal, that is to say the output signal from the pulse shaping filter 9 has a narrower bandwidth than the original modulation data signal 8. The digital output signal from the pulse shaping filter 9 has a signal 10 for indication of the channel (also referred to as a channel word) superimposed on it. The resultant digital signal is received by a sigma-delta modulator 11 which drives the modulation input 7 of the PLL. The sigma-delta modulator 11 uses the resultant digital signal to produce a signal which fluctuates over time (also referred to as a "dithering"), so that the division ratio N effectively represents a fractional number rather than a natural number. A modulator as illustrated in FIG. 1 is thus also referred to as a sigma-delta fractional N modulator. The use of a sigma-delta modulator for generation of an effectively fractional division ratio is in principle not essential, but increases the modulation resolution and thus reduces the phase noise.

The circuit illustrated in FIG. 1 has the disadvantage that the bandwidth of the transfer function of the PLL from the modulation input 7 to the output 5 of the PLL (referred to for short as the bandwidth of the PLL in the following text) must satisfy two mutually contradictory conditions. On the one hand, the bandwidth must be designed to be as narrow as possible in order to produce as little noise as possible at the output of the modulator. On the other hand, it is necessary to ensure for the transmission of the modulation data signal 8 that the bandwidth of the PLL is wider than the bandwidth of the signal applied to the modulation input 7, that is to say the bandwidth must be chosen to be appropriately high for transmission of a modulation data signal 8 at as a high a data rate as possible. For this reason, as high a data rate as possible and as little noise as possible on the output side can be combined with one another only with difficulty with the concept as illustrated in FIG. 1.

Owing to component scatters, temperature fluctuations and operating-voltage fluctuations practical implementation of a modulator as illustrated in FIG. 1 is subject to the problem that the PLL bandwidth as provided by the developer is subject to major tolerances during operation. In order to ensure that the modulation data signal 8 is transmitted at a predetermined data rate, the bandwidth of the PLL must accordingly be chosen to be higher, in order to cover these tolerances. In general, the bandwidth which is actually used during operation is thus considerably too high, thus unnecessarily increasing the phase noise in the modulator.

The dissertation "Techniques for High Data Rate Modulation and Low Power Operation of Fractional-N Frequency Synthesizers" by Michael Henderson Perrot, Massachusetts Institute of Technology, September 1997, describes a concept for sigma-delta fractional N modulators in which the bandwidth of the signal which is applied to the modulation input 7 can be chosen to be wider than the bandwidth of the PLL, so that the data rate of the modulation data signal 8 can be increased. In this case, the complexity and power losses in the sigma-delta fractional N modulator are only slightly higher than those which occur in the modulator illustrated in FIG. 1.

Figure 2:
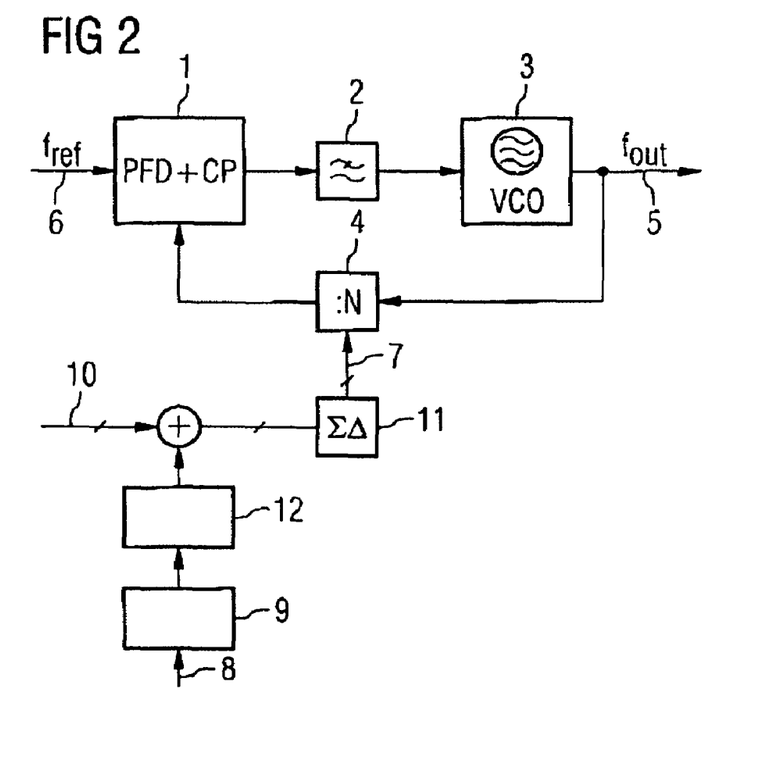
FIG. 2 shows a circuit diagram of a sigma-delta fractional N modulator with an additional compensation filter according to the prior art.

FIG. 2 shows the sigma-delta fractional N modulator as proposed by Perrot. Circuit parts and signals which are provided with the same reference symbols in FIG. 1 and FIG. 2 in this case correspond to one another. The increase in the data rate of the modulation data signal 8 is achieved by the use of a digital compensation filter 12, which is connected downstream from the pulse shaping filter 9. The transfer function of the compensation filter 12 in this case corresponds to the inverse of the transfer function of the PLL from the modulation input 7 to the output 5 of the PLL, and the resultant transfer function of the compensation filter 12 and of the PLL is thus at least in theory constant, so that the data rate of the modulation data signal 8 can be chosen to be considerably wider than the bandwidth of the PLL. The compensation filter 12 can in this case be combined with the pulse shaping filter 9 as a single digital FIR filter (FIR=finite impulse response). The filter coefficient for the pulse shaping filter 9, which are stored in a ROM (ROM=read only memory) must be adapted as appropriate for integration of the compensation filter 12 in the pulse shaping filter 9.

One major factor for the modulator concept illustrated in FIG. 2 is that the use of the additional compensation filter 12 does not increase the noise, since the provision of the compensation filter 12 effectively corresponds only to a change in the pulse shaping filter 9, so that the analogue circuit section is not affected.

The modulator concept illustrated in FIG. 2 has the disadvantage that the matching between the digital compensation filter 12 and the analogue PLL, in particular the analogue loop filter 2, is subject to stringent requirements. The bandwidth of the PLL can fluctuate owing to component tolerances in the analogue filter components of the analogue loop filter 2, or owing to scatter in the control gradient of the VCO 3. Thus, in practice, it is impossible to completely compensate a transfer function of the PLL for the transfer function of the digital compensation filter 12, taking into account manufacturing tolerances. Fluctuations in the operating temperature and supply voltage also have a similar negative influence.

Figure 3:
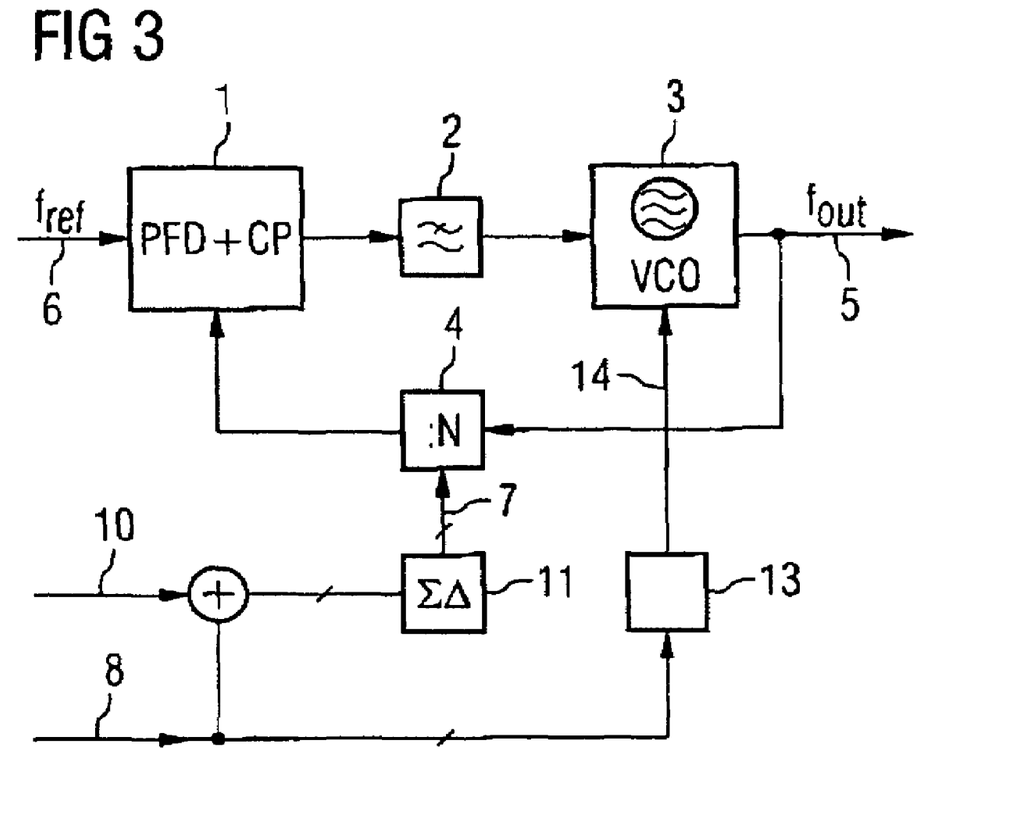
FIG. 3 shows a circuit diagram of a sigma-delta fractional N modulator with two modulation points according to the prior art.

FIG. 3 illustrates an alternative concept to that illustrated in FIG. 2 for increasing the data rate of a sigma-delta fractional N modulator. In contrast to the 1-point modulators illustrated in FIG. 1 and FIG. 2, the sigma-delta fractional N modulator illustrated in FIG. 3 is a 2-point modulator. Circuit parts and signals which are provided with the same reference symbols in FIG. 2 and FIG. 3 in this case correspond to one another. In the case of the 2-point modulator which is illustrated in FIG. 3, the modulation data signal 8 is fed to the PLL not only via the control input 7 of the frequency divider 4 (analogously to FIG. 1 and FIG. 2), but also via a second control input 14 of the VCO 3. In this case, the VCO 3 is modulated directly via the second control input 14. Furthermore, a digital/analogue converter and an analogue pulse shaping filter are required to drive the VCO 3 via the second control input 14, and these are formed by the circuit block 13. In the case of the 2-point modulator illustrated in FIG. 3, the low-frequency signal components of the modulation data signal 8 modulate the PLL via the frequency divider 4, while the high-frequency signal components of the modulation data signal 8, predominantly at frequencies higher than the bandwidth of the PLL, modulate the VCO 3 directly.

The 2-point modulator illustrated in FIG. 3 has the disadvantage that the additional circuit block 13 increases the power consumption of the 2-point modulator in comparison to conventional 1-point modulators. Furthermore, the concept illustrated in FIG. 3 has similar disadvantages to those of the concept illustrated in FIG. 2, that is to say the matching between the digital modulation path and the analogue modulation path is subject to stringent requirements for correct operation of the modulator illustrated in FIG. 3.

SUMMARY

Against the background of the prior art described in FIG. 1, one object of the invention is to specify a PLL-based modulator which avoids the conflict described above in the choice of the bandwidth of the PLL. A modulator such as this is intended not to have the disadvantages, in particular the matching problems, of modulator concepts which are known from the prior art (see FIG. 2 and FIG. 3), which already attempt to overcome this conflict. A further object of the invention is to specify a corresponding method for a PLL-based modulator, which overcomes the conflict described above in the choice of the bandwidth of the PLL.

A modulator for a transmitter for a digital communication system, the modulator comprises a phase locked loop with a reference frequency input, a modulation input for modulation of the phase locked loop, and an output for outputting a modulated signal, wherein the bandwidth of the transfer function between the modulated signal and the signal at the modulation input is variable, a means for determination of a first signal, which is characteristic of the modulation shift of the modulated signal, a means for provision of a second signal, which is characteristic of a nominal modulation shift, a comparison means for comparison of the first signal with the second signal, and a means for variation of the bandwidth as a function of the output signal from the comparison means.

The phase locked loop may have a frequency divider whose division ratio is adjusted via the modulation input of the phase locked loop. The modulator may have a sigma-delta modulator, whose output is electrically connected to the modulation input of the phase locked loop and whose input signal is based on a modulation data signal. The means for variation of the bandwidth can be designed in such a way that the bandwidth of the transfer function mentioned above is increased when the first signal is less than the second signal, and that the bandwidth of the transfer function mentioned above is reduced when the first signal is greater than the second signal. The current of a charge pump as a component of the phase locked loop or the transfer function of a loop filter as a component of the phase locked loop can be varied via the means in order to vary the bandwidth. The control gradient of a voltage controlled oscillator as a component of the phase locked loop can be varied via the means for variation of the bandwidth. The means for determination of the first signal which is characteristic of the modulation shift of the modulated signal may have a demodulator, which is used for demodulation of the modulated signal. The demodulator can be switchable in such a way that it can be operated both in the reception mode as part of a receiver, and in the transmission mode as part of the modulator for demodulation of the modulated signal. The means for determination of the first signal which is characteristic of the modulation shift of the modulated signal may have an averaging circuit which is arranged on the output side of the demodulator. The modulation data signal can be a periodic test signal, in particular an alternating binary test signal. The means for provision of the second signal, which is characteristic of the nominal modulation shift, may generate the second signal as a function of the modulation data signal. The means for provision of the second signal, which is characteristic of a nominal modulation shift, may have a delay means for delaying the second signal. The modulator can be a PSK or FSK modulator, in particular a GPSK modulator. The modulator can be a modulator for a DECT-compatible or Bluetooth-compatible transmitter.

The modulator according to one embodiment for a transmitter for a digital communication system comprises a PLL with a reference frequency input, a modulation input for modulation of the PLL and an output for outputting a modulated signal. This is therefore a modulator which is based on direct modulation of a PLL. The PLL in this case has the characteristic that the bandwidth of the transfer function between the modulated signal and the signal at the modulation input is variable. The modulator also includes a means for determination of a first signal which is characteristic of the modulation shift, for example of the phase or frequency modulation shift. A means is also provided for provision of a second signal, which is characteristic of a nominal modulation shift. The modulator furthermore has a comparison means for comparison of the first signal with the second signal. Finally a means is provided for variation of the bandwidth as a function of the output signal from the comparison means.

The modulator according to an embodiment is based on the capability to optimally set the bandwidth of the PLL on a component-specific basis in every operating situation. If the actual modulation shift determined by the appropriate means is too small in comparison to the nominal modulation shift, this is an indication that the bandwidth is too narrow and that the transmission of a modulation data signal at a correspondingly high bit rate will be adversely affected. In this situation, the modulator according; to the invention offers the capability to appropriately increase the bandwidth of the PLL. If, conversely, the actual modulation shift is very great in comparison to the nominal modulation shift, the actual bandwidth of the PLL is too high, so that the PLL has an unnecessarily large amount of noise on the output side. In this situation as well, the modulator according to the invention offers the capability to reduce the bandwidth of the PLL appropriately.

Thus, in comparison to the modulator illustrated in FIG. 1, the modulator according to an embodiment has the advantage that the PLL bandwidth which is actually set in an operating situation is just sufficiently high to ensure transmission of the modulation data signal, while the noise on the output side in this case remains as low as possible at the same time. The procedure mentioned above of choosing the bandwidth of the PLL to be generally higher than is actually necessary in order to cover tolerances is therefore unnecessary for the modulator according to the invention.

As already mentioned above, the modulator according to an embodiment is based on direct modulation of a PLL, with the PLL being modulated via the modulation input. The PLL advantageously has a frequency divider whose division ratio is varied via the modulation input of the PLL. The PLL of the modulator according to the invention is thus modulated via a control input in order to vary the division ratio.

In order to reduce the noise on the output side, the modulator advantageously has a sigma-delta modulator whose output is electrically connected to the modulation input of the PLL and whose input signal is used as the basis for a modulation data signal. A modulator such as this is also referred to as a sigma-delta fractional N modulator, as already mentioned above.

However, the input signal to the sigma-delta modulator need not necessarily correspond to the modulation data signal; for example, as is illustrated in FIG. 1, the modulation data signal may first of all be filtered on the input side of the sigma-delta modulator by means of a pulse shaping filter.

The means for variation of the bandwidth is advantageously designed such that the bandwidth of the transfer function of the PLL is increased when the first signal is less than the second signal. The means for variation of the bandwidth also makes it possible to reduce the bandwidth when the first signal is larger than the second signal. The means for variation of the bandwidth is thus designed such that the bandwidth is increased when the modulation shift of the modulated signal is less than the nominal modulation shift, and such that the bandwidth is reduced when the modulation shift of the modulated signal is greater than the nominal modulation shift.

According to one advantageous embodiment, the current of a charge pump as a component of the phase locked loop can be varied by the means for adjustment of the bandwidth. The current in this case influences the bandwidth of the PLL. Section 2.3 of the dissertation "Techniques for High Data Rate Modulation and Low Power Operation of Fractional-N Frequency Synthesizers" mentioned above specifies an equation for the transfer function of the PLL. In this case, the transfer function G(f) of the PLL is given by:

$$G(f) = \frac{H(f) \cdot K_v / (\pi N)}{jf + H(f) \cdot K_v / (\pi N)} \quad (2)$$

The variable H(f) in this case describes the transfer function of the loop filter in conjunction with the charge pump. The variable $K_v$ indicates the control gradient of the VCO, while the variable N describes the nominal division ratio. As can be seen from equation 2, the greater the magnitude of H(f), the wider is the bandwidth of the PLL. This means that the bandwidth of the PLL increases with the current of the charge pump.

Alternatively or additionally, the transfer function of a loop filter as a component of the phase locked loop can also be varied via the means for variation of the bandwidth. In this case, it is possible to program individual resistors or capacitors in the loop filter. Programmable means that these resistors or capacitors in the loop filter can be activated and deactivated or, as an alternative, their values can also be changed. The transfer function of the loop filter may, for example, be variable in such a way that it is possible to vary either the bandwidth of the transfer function and/or the DC gain, that is to say the gain at 0 Hz, of the loop filter. As can be derived from equation 2, the bandwidth of the PLL increases with the DC gain of the loop filter. As is also evident from equation 2, a narrower bandwidth of the transfer function of the loop filter in general results in a reduction in the bandwidth of the PLL.

According to one advantageous embodiment, the control gradient of a VCO as a component of the phase locked loop can be varied via the means for variation of the bandwidth. As can be seen from equation 2, any increase in the control gradient of the VCO results in an increase in the bandwidth of the PLL.

The means for determination of the first signal which is characteristic of the modulation shift of the modulated signal advantageously has a demodulator which is used for demodulation of the modulated signal. The demodulator thus produces the modulation signal of the modulated signal, that is to say frequency information or phase information. A demodulator such as this in this case generally has at least one analogue mixer. The actual demodulator core is connected downstream from the analogue mixer and is frequently in digital form. Heterodyne or homodyne approaches may be considered for a demodulator such as this.

In this case, it is advantageous for the demodulator to be switchable in such a way that it can be operated not only in the reception mode as part of a receiver but also in the transmission mode as part of the modulator for demodulation of the modulated signal. The advantage of a demodulator such as this is that, with the exception of the provision of the switching capability, no additional hardware is required for demodulation of the modulated transmission signal, provided that a demodulator is already present in the receiver and is used for two tasks.

The means for determination of the first signal which is characteristic of the modulation shift of the modulated signal advantageously has an averaging circuit, which is arranged on the output side of the demodulator. A demodulated phase or frequency signal which changes over time as the output signal from the demodulator can be averaged by means of a circuit such as this. The averaged signal at the output of this circuit is then characteristic of the mean modulation shift of the modulated signal. A circuit for magnitude formation can optionally be provided between the output of the demodulator and the averaging circuit.

The modulation data signal is advantageously a periodic test signal, in particular an alternating binary test signal when using binary modulation such as GFSK (gaussian frequency shift keying). A binary test signal such as this is based on a digital data sequence "1010 . . . ".

According to one advantageous embodiment, the means for provision of the second signal which is characteristic of the nominal modulation shift generates the second signal as a function of the modulation data signal, that is to say the modulation data signal on which the modulation of the PLL is based, is also used to obtain the second signal which is characteristic of the nominal modulation shift.

In this case, it is advantageous for the means for provision of the second signal which is characteristic of a nominal modulation shift to have a delay means for delaying the second signal. The delay means can be used to compensate for the delay time in the circuit driving the PLL, in the PLL itself and in the demodulator, so that the first signal and the second signal are based on the same values of the modulation data signal at the comparison time. In this case, it is also feasible to delay the modulation data signal which forms the basis of the second signal.

A method for adjustment of a modulator for a transmitter for a digital communication signal, with the modulator having a phase locked loop with a reference frequency input, a modulation input for modulation of the phase locked loop, and an output for outputting a modulated signal, wherein the bandwidth of the transfer function between the modulated signal and the signal at the modulation input is variable, comprises the following steps:

- determining a first signal which is characteristic of the modulation shift of the modulated signal;
- providing a second signal which is characteristic of a nominal modulation shift;
- comparing the first signal with the second signal, and
- varying the bandwidth of the transfer function between the modulated signal and the signal at the modulation input.

The bandwidth of the transfer function mentioned above can be varied in such a way that the bandwidth of the transfer function mentioned above is increased when the first signal is less than the second signal, and that the bandwidth of the transfer function mentioned above is reduced when the first signal is greater than the second signal. The method can be started once the modulator has been switched on. The method can also be started when there is a specific change in the temperature of the modulator and/or the supply voltage to the modulator.

The method according to an embodiment is used for variation of a modulator for a transmitter in a digital communication system. The modulator on which the method is based has a PLL with a reference frequency input, a modulation input for modulation of the PLL and an output for outputting a modulated signal. The bandwidth of the PLL is in this case variable. A first signal which is characteristic of the modulation shift of the modulated signal is determined during the method. Furthermore, a second signal which is characteristic of a nominal modulation shift is provided. The first signal is compared with the second signal. The bandwidth of the PLL is varied as a function of the comparison.

The method is advantageously started after the modulator has been switched on, that is to say before the start of transmission. Alternatively or additionally, the method can advantageously be started in the event of a specific change in the temperature of the modulator and/or in the supply voltage to the modulator. A temperature sensor and/or an operating voltage monitoring circuit should be provided for this purpose. A measure such as this is worthwhile because changes such as these in the operating environment have an influence on the bandwidth of the PLL, and can shift it such that the modulation shift is changed. In this case, the method according to the invention makes it possible to correct the bandwidth to the optimum value again.

BRIEF DESCRIPTION OF THE DRAWINGS

The invention will be explained in more detail in the following text using two exemplary embodiments and with reference to the drawings, in which.

DETAILED DESCRIPTION

With regard to FIGS. 1 to 3, which relate to the prior art, reference is made to the above statements in the introduction to the description.

Figure 4:
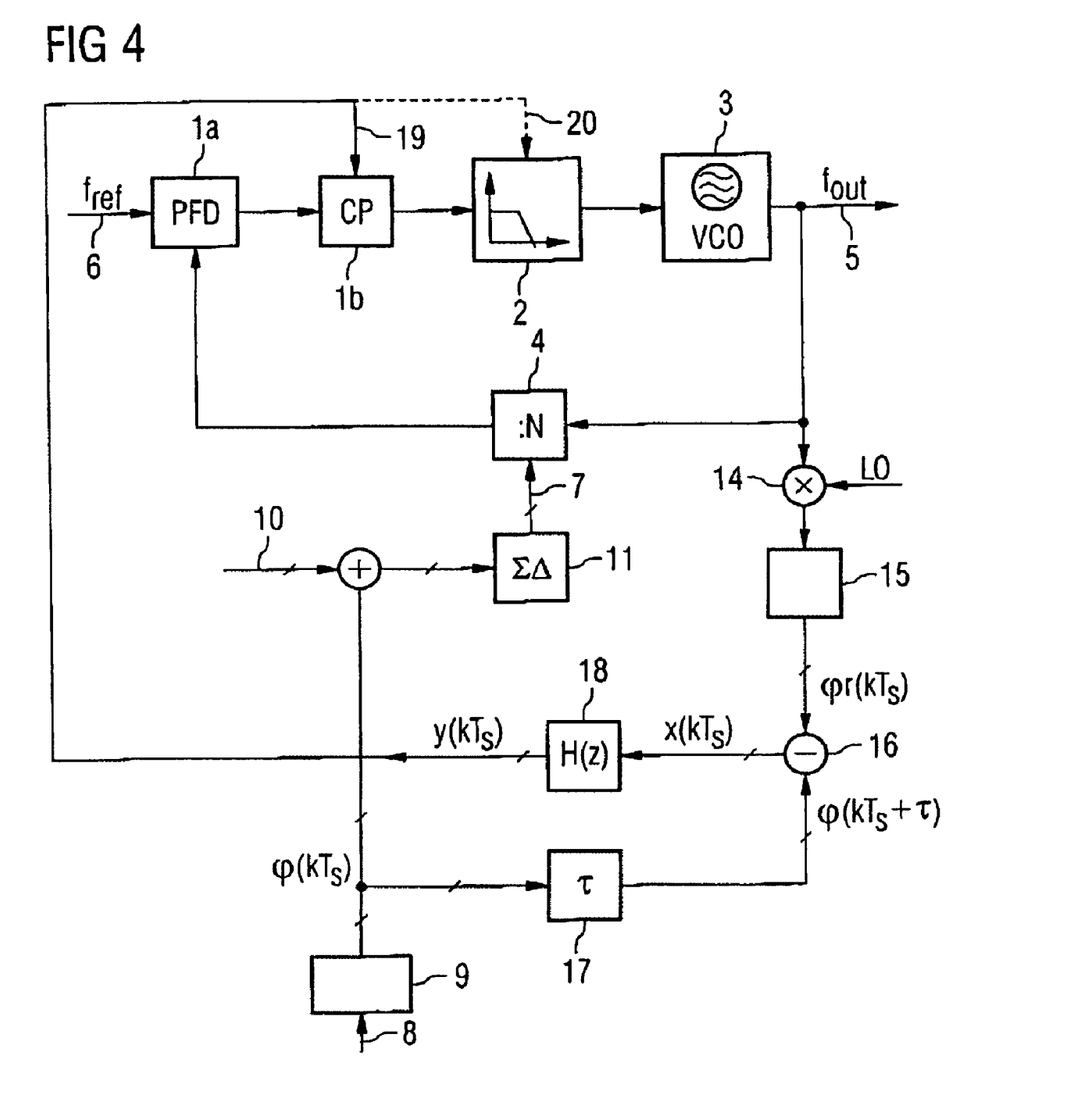
FIG. 4 shows a circuit diagram of a first exemplary embodiment of a sigma-delta fractional N modulator according to the invention.

The sigma-delta fractional N modulator which is known from the prior art and is shown in FIG. 1 represents the point of origin for the first exemplary embodiment of the modulator according to the invention as illustrated in FIG. 4. The statements relating to the circuit shown in FIG. 1 can also be transferred to the modulator according to the invention as shown in FIG. 4. Circuit parts and signals which are provided with the same reference symbols in FIG. 1 and FIG. 4 correspond to one another. In contrast to the block diagram shown in FIG. 1, the phase frequency detector 1a and the charge pump 1b are illustrated separately in the block diagram in FIG. 4.

The difference between the modulator illustrated in FIG. 1 and the first exemplary embodiment of the modulator according to the invention illustrated in FIG. 4 is that the modulator according to the invention has an additional control process for variation of the bandwidth of the PLL. The modulator which is illustrated explicitly in FIG. 4 is a PSK modulator (phase shift keying), although the concept illustrated in FIG. 4 can be transferred in the same way to a FSK-based modulator (frequency shift keying).

The modulated signal at the output 5 of the PLL is first of all demodulated in order to vary the bandwidth. The demodulation process is roughly subdivided into frequency translation by means of a mixer stage 14 and the actual demodulation process in a digital demodulator block 15.

For frequency translation, the modulated signal at the output 5 of the PLL is mixed with the local oscillator signal LO via the mixer stage 14 to a lower-frequency frequency band. Depending on the choice of the frequency of the local oscillator signal LO, the output signal from the mixer stage 14 corresponds directly to the baseband signal (zero-IF demodulation) or has a low carrier frequency (low-IF demodulation). Alternatively, a conventional heterodyne demodulation concept can also be provided, using a plurality of cascaded mixer stages.

The mixer stage 14 is followed by the digital demodulator block 15 which carries out the actual demodulation of the modulated signal. Furthermore, a channel filter and an analogue/digital converter are provided between the mixer stage 14 and the digital demodulator block 15, but these are not illustrated in FIG. 4. In the present exemplary embodiment, the digital demodulator block 15 carries out phase demodulation. The digital output signal $\phi_r(kT_s)$ from the digital demodulator block 15 at a sampling rate of $1/T_s$ corresponds to phase modulation of the modulated signal of the output 5 of the PLL. The digital modulation signal $\phi_r(kT_s)$ is compared with a digital nominal modulation signal $\phi(kT_s+\tau)$ in a digital comparison means 16 in order to control the bandwidth of the PLL, with the comparison means 16 carrying out a digital subtraction process. The nominal modulation signal ($\phi(kT_s+\tau)$ corresponds to the digital output signal $\phi(kT_s)$ from the pulse shaping filter 9, delayed by a delay means 17. The time delay $\tau$ of the delay means 17 is in this case chosen such that the signals $\phi(kT_s+\tau)$ and $\phi_r(kT_s)$ to be compared are based on the same values of the modulation data signal 8 at the comparison time, that is to say the time delay $\tau$ corresponds to the time delay from the output of the pulse shaping filter 9 to the output of the digital demodulator block 15.

The output signal $x(kT_s)$ from the comparison means 16, which represents the control error signal, is fed to a digital filter 18 with the transfer function H(z). The transfer function H(z) of the filter 18 corresponds to the transfer function of a PI regulator. The I component of the PI regulator 18 may in this case be provided by an accumulator with feedback. The output signal $y(kT_s)$ from the regulator 18 is fed to the digital control input 19 of a variable charge pump 1b. The analogue current of the charge pump 1b can be set via the digital control input 19 of the variable charge pump; that is to say digital/analogue conversion is carried out at this interface.

Alternatively (indicated by a dashed arrow), it is possible to provide for the output signal $y(kT_u)$ from the regulator 18 to be fed to the control input 20 of a variable PLL group filter 2. The transfer function of the filter 2 can be modified via the control input 20 of the variable PLL loop filter 2, for example the DC gain or the bandwidth of the filter 2. Programmable resistors or capacitors may be provided for this purpose, with their values being changed via the signal at the control input 20.

Furthermore, it is possible for the output signal $y(kT_s)$ from the regulator 18 to be alternatively fed to an additional control input (not illustrated) of the VCO 3, via which the control gradient $K_v$ of the VCO 3 can be influenced. In a similar manner, it would also be feasible to vary the characteristic of the phase frequency detector 1a as a function of the signal $y(kT_s)$.

The bandwidth of the transfer function (as stated above in equation 2) of the PLL from the modulation input 7 to the output 5 of the PLL is carried out by variation of the current of the charge pump 19, the transfer function of the loop filter 2, or parameters of other components in the PLL. Since this is a closed control loop with feedback, the bandwidth of the PLL is varied until the error signal $x(kT_s)$ has the value 0. In this case, the modulation signal $\phi_r(kT_s)$ corresponds to the nominal modulation signal $\phi(kT_s+\tau)$, so that the bandwidth of the PLL is optimally set.

A periodic test data pattern, for example the alternating bit sequence "1010 . . . ", should preferably be used as the modulation data signal 8.

The control of the bandwidth of the PLL need not be active all the time. The control of the bandwidth should advantageously initially be activated before the actual transmission after starting the mobile radio, so that the bandwidth of the PLL and hence the modulation shift as well are set optimally on a basis which is specific to the equipment and the operating environment (for example in terms of the operating temperature or the voltage supply). It is also possible to provide for the temperature of the modulator and the supply voltage for the modulator to be monitored with the aid of a temperature sensor and/or an operating voltage monitoring circuit. The method according to the invention is then started once again in the event of a specific change in the temperature or supply voltage, in order to match the bandwidth of the PLL and thus the modulation shift to the changed operating environment. The influence of production, temperature and supply voltage tolerances on the modulation shift can thus be compensated for with the aid of the method according to the invention.

In this case, the PLL can also be adjusted in a number of steps; in this case, the adjustment process is based on a successive approximation algorithm (SAR).

Figure 5:
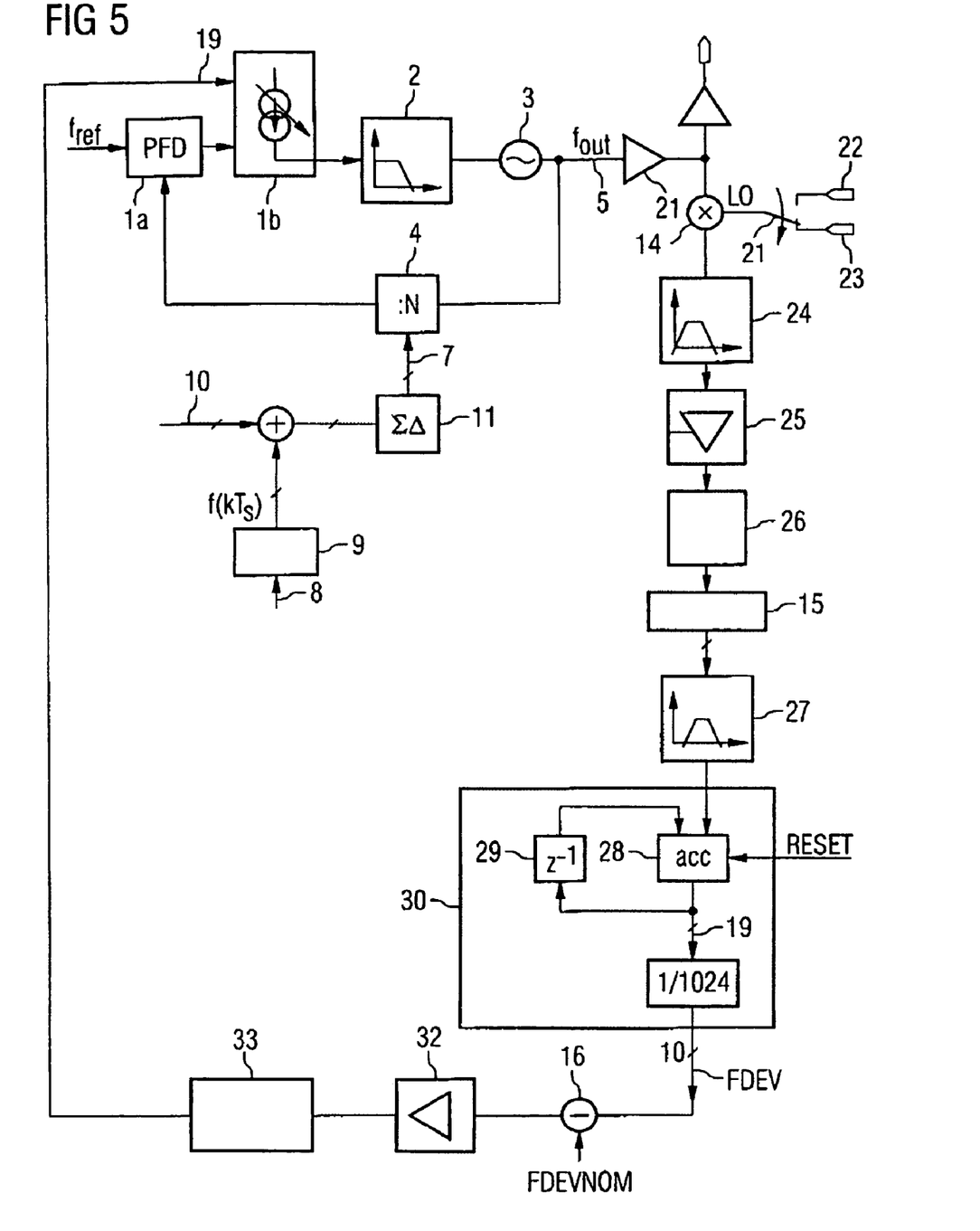
FIG. 5 shows a circuit diagram of a second exemplary embodiment of a sigma-delta fractional N modulator according to the invention.

FIG. 5 shows a circuit diagram of a second exemplary embodiment of a sigma-delta fractional N modulator according to the invention. Circuit parts and signals which are provided with the same reference symbols in FIG. 4 and FIG. 5 in this case correspond to one another. In contrast to the modulator illustrated in FIG. 4, the modulator illustrated in FIG. 5 is based on FSK modulation, in particular on GFSK modulation (gaussian frequency shift keying), as is used, by way of example, in Bluetooth or DECT systems. Thus, in contrast to FIG. 4, the output signal $f(kT_S)$ from the pulse shaping filter 9 is frequency information rather than phase information $\phi(kT_S)$ as in FIG. 4.

The frequency-modulated signal at the output 5 of the PLL is read via a buffer 21 and is supplied to the switchable mixer stage 14, which can be switched such that it can be operated not only in the reception mode as part of a receiver but also in the transmission mode as part of the modulator for demodulation of the modulated signal. Furthermore, the circuit components of the demodulator which are connected to the mixer stage are also used in two forms, in the same way. Further switches, multiplexers etc which are required for the double use of the demodulator; are not shown in FIG. 5, for simplicity reasons.

When the mixer stage 14 is operated in the reception mode as part of the receiver, the switch illustrated in FIG. 5 is in the upper switch position; in this case, the LO signal is supplied for the reception mode via an input 22. For demodulation of the modulated signal, the switch 21 is in the lower switch position. A square-wave signal with a period duration $T_{ref}=1/f_{ref}$ is supplied via an input 23, that is to say the frequency of the fundamental of the square-wave signal corresponds to the frequency of the reference signal for the PLL. The square-wave signal has harmonics so that a large number of mixing products based on the individual harmonics of the LO signal are produced at the output. A non-linear element, for example a limiting amplifier, can be used to produce the square-wave signal from a signal at the frequency $f_{ref}$. The correct mixing product is selected by means of a variable analogue channel filter 24, which is provided on the output side of the mixer stage 14.

If the demodulation process is based on zero-IF demodulation (that is to say a signal without any carrier is supplied to the digital demodulator 14), the channel filter 24 is set such that the mixing product which is selected is that which is based on the $(N_{stat}-1)$-th harmonic of the signal at the input 23, with the variable $N_{stat}$ corresponding to the steady-state division ratio of the frequency divider 4 without taking any account of the modulation via the data input 8, that is to say only the channel word 10 is considered. For example, the variable $N_{stat}$ is given by $N_{stat}=2444/26=94$ for a reference frequency $f_{ref}$ of 26 MHz and a channel mid-frequency of 2444 MHz, selected via the channel word 10.

If the demodulation process is based on low-IF demodulation (that is to say a signal at a low carrier frequency is supplied to the digital demodulator 14), the steady-state division ratio $N_{stat}$ of the divider can be set, with an appropriate choice of the channel word 10, for calibration of the bandwidth PLL such that the variable $N_{stat}$ is a fractional number. If the steady-state division ratio $N_{stat}$ is chosen to be 94.5 at a reference frequency $f_{ref}$ of 26 MHz, the signal at the input of the mixer stage 14 is at a frequency of 2457 MHz. Assuming an intermediate frequency of 13 MHz, the mixing product must be chosen based on the $(N_{stat}-1)$-th harmonic of the signal at the input 23.

In order to simplify the demodulation process, the output signal from the channel filter 24 is converted by means of the limiting amplifier 25 to a square-wave signal, which is then converted to an oversampled digital signal by means of the sampler 26. Alternatively, an analogue/digital converter could also be provided. The digital output signal from the sampler 26 is received by the digital demodulator block 15. The digital demodulator block 15 produces a pulse-amplitude-modulated signal, which indicates the frequency modulation of the PLL output signal. When using a binary alternating modulation data signal 8 in the form "1010 . . . ", the digital output signal from the demodulator block 15 has a sinusoidal waveform. An additional filter 27 can also optionally be provided for noise filtering and signal smoothing. The negative minimum values and the positive maximum values of the digital output signal are selected from the digital sample values (not illustrated). The magnitude of the selected sample values is then determined (not illustrated).

A digital circuit 30 is then provided for averaging over time, and its output side indicates the measured mean frequency shift FEDV. The circuit 30 has an accumulator 28 with feedback via a register 29, which accumulator 28 adds the sample values arriving during a time window, for example 1024 sample values. The summation duration is determined by the reset signal RESET. The output signal from the accumulator 28 is then divided by the number of accumulated sample values. The number of accumulated sample values is preferably a power of two, so that the division process is carried out by bit-shifting. In the present case, in order to divide by 1024, only the 10 most significant bits of the 19-bit-long output signal from the accumulator 28 are passed on. The mean frequency shift FDEV determined via the circuit 30 is compared with a stored nominal frequency shift FEDVNOM, with the determined mean frequency shift FEDV being subtracted from the nominal frequency shift FEDVNOM. The subtraction result represents the control error signal. This is received by a loop filter 32. The output signal from the loop filter 32 is fed to a control circuit 33. The control circuit 33 uses a successive approximation algorithm, which either increases or decreases the current of the charge pump 1b. However, analogously to FIG. 4, other variable components of the PLL can also be driven as a function of the output signal from the control circuit 33.

Figure 6:
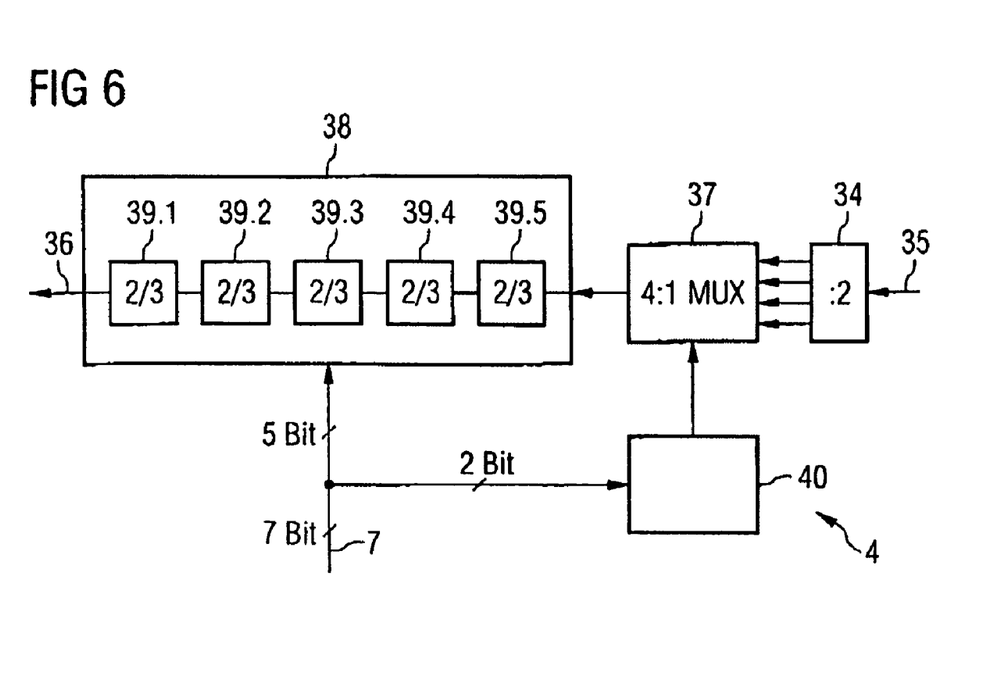
FIG. 6 shows a detailed circuit diagram of the implementation of the variable frequency divider.

FIG. 6 shows a detailed circuit diagram of the implementation of the variable frequency divider 4. This frequency divider 4 has a frequency input 35, a frequency output 36 and a control input 7 for variation of the division ratio, which corresponds to the modulation input 7 of the modulators illustrated in FIGS. 1 to 5. The 1:2 frequency divider 34 (typically in the form of a master-slave D flipflop with feedback) receives the signal at the frequency input, 35 and on the output side 4 in each case produces 90° phase-shifted signals at half the frequency. One of the 4 phases can be selected via a multiplexer 37. The selected phase is supplied to a divider cascade 38 formed by 5 variable frequency dividers 39.1-39.5 with each of the 5 frequency dividers 39.1-39.5 having a division ratio of 2 or 3, which can be varied independently of one another. The division ratio of the entire divider cascade 38 can thus be varied in the range from 32 to 63. The divider cascade thus forms a so-called multi-modulus divider.

The control input 7 for variation of the division ratio of the frequency divider 4 has a length of 7 bits, with the 5 most significant bits indicating the division ratio of the divider cascade 38. Furthermore, the remaining two least significant bits can be used to set fractional division ratios of the frequency divider 4. A control circuit 40 receives the two least significant bits at the control input 7 and produces the selection signal for the multiplexer 37 as a function of these two bits. The selection signal is in this case passed on continuously, so that the phase of the output signal from the multiplexer jumps continuously, thus making it possible to provide non-integer division ratios. This measure increases the resolution of the division ratio of the frequency divider 4 by a factor of 4 in comparison to an otherwise identical frequency divider with a purely integer division ratio.

Figure 7:
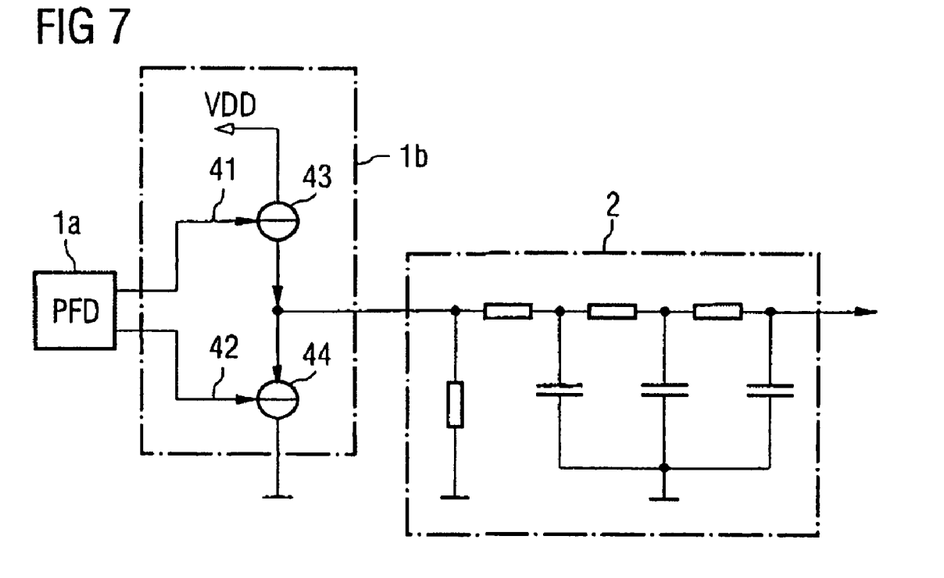
FIG. 7 shows a detailed circuit diagram of the implementation of the charge pump and of the loop filter.

FIG. 7 shows the implementation of the charge pump 1b and of the loop filter 2 in the PLL. The output signal from the phase frequency detector 1a is subdivided into two digital signal elements 41 and 42, which are frequently also referred to as UP and DOWN, respectively. Either the signal element 41 or the signal element 42 is set to the active state, in a pulsed form, depending on the polarity of the phase error between the input signals of the phase frequency detector 1a.

When the signal element 41 (UP) is active, a first switchable current source 43 is activated while, on the other hand, when the signal element 42 (DOWN) is active, a second switchable current source 44 is activated. In this case, the first current source 43 and the second current source 44 are of different polarity and jointly drive the input of the loop filter 2.

In order to vary the PLL bandwidth on the basis of the current of the charge pump 1b, the charge pump 1b—as already described above—has a control input 19 (not illustrated). The magnitude of the current from the current sources 43 and 44 can be varied with the aid of the control input 19.

The loop filter 3 is in the form of a non-integrating loop filter. Only passive resistors and capacitors are required for its production.

Finally, it should also be noted that the output-side phase or frequency modulation is not essential for a PSK modulator or for an FSK modulator. For the purpose of the application, it is feasible for the frequency modulation also to alternatively be determined for a PSK modulator, or for the phase modulation to be determined for an FSK modulator.

What is claimed is:

1. A modulator for a transmitter for a digital communication system, the modulator comprising:
   a phase locked loop with a reference frequency input, a modulation input for modulation of the phase locked loop, and an output for outputting a modulated signal, wherein a bandwidth of a transfer function between a modulated signal and a signal at the modulation input is variable,
   a means for determination of a first signal, which is characteristic of a modulation shift of the modulated signal, a means for provision of a second signal, which is characteristic of a nominal modulation shift, a comparison means for comparison of the first signal with the second signal, and a means for variation of the bandwidth as a function of the output signal from the comparison means wherein the means for variation of the bandwidth comprise a digital having a transfer function corresponding to the transfer function of a PI regulator, wherein the I-component of the PI regulator is provided by an accumulator with feedback.

2. The modulator according to claim 1, wherein the phase locked loop has a frequency divider whose division ratio is adjusted via the modulation input of the phase locked loop.

3. The modulator according to claim 2, wherein the modulator has a sigma-delta modulator, whose output is electrically connected to the modulation input of the phase locked loop and whose input signal is based on a modulation data signal.

4. The modulator according to claim 1, wherein the means for variation of the bandwidth is designed in such a way that the bandwidth of the transfer function is increased when the first signal is less than the second signal, and that the bandwidth of the transfer function is reduced when the first signal is greater than the second signal.

5. The modulator according to claim 1, wherein the current of a charge pump as a component of the phase locked loop can be varied via the means in order to vary the bandwidth.

6. The modulator according to claim 1, wherein the transfer function of a loop filter as a component of the phase locked loop can be varied via the means in order to vary the bandwidth.

7. The modulator according to claim 1, wherein the control gradient of a voltage controlled oscillator as a component of the phase locked loop can be varied via the means for variation of the bandwidth.

8. The modulator according to claim 1, wherein the means for determination of the first signal which is characteristic of the modulation shift of the modulated signal has a demodulator, which is used for demodulation of the modulated signal.

9. The modulator according to claim 8, wherein the demodulator is switchable in such a way that it can be operated both in the reception mode as part of a receiver, and in the transmission mode as part of the modulator for demodulation of the modulated signal.

10. The modulator according to claim 8, wherein the means for determination of the first signal which is characteristic of the modulation shift of the modulated signal has an averaging circuit which is arranged on the output side of the demodulator.

11. The modulator according to claim 3, wherein the modulation data signal is a periodic test signal, in particular an alternating binary test signal.

12. The modulator according to claim 3, wherein the means for provision of the second signal, which is characteristic of the nominal modulation shift, generates the second signal as a function of the modulation data signal.

13. The modulator according to claim 12, wherein the means for provision of the second signal, which is characteristic of a nominal modulation shift, has a delay means for delaying the second signal.

14. The modulator according to claim 1, wherein the modulator is a PSK or FSK modulator, in particular a GPSK modulator.

15. The modulator according to claim 1, wherein the modulator is a modulator for a DECT-compatible or Bluetooth-compatible transmitter.

16. The modulator according to claim 1, wherein the means for variation of the bandwidth comprise a control circuit using a successive approximation algorithm.

17. The modulator according to claim 16, wherein the successive approximation algorithm controls the current of a charge pump.

* * * * *

UNITED STATES PATENT AND TRADEMARK OFFICE
CERTIFICATE OF CORRECTION

PATENT NO. : 7,643,572 B2  Page 1 of 1
APPLICATION NO. : 11/251514
DATED : January 5, 2010
INVENTOR(S) : Puma It is certified that error appears in the above-identified patent and that said Letters Patent is hereby corrected as shown below:

Column 13, line 8, claim 1, delete "having a transfer" and insert in place thereof --filter having a transfer--.

Signed and Sealed this

Twenty-fifth Day of May, 2010

David J. Kappos
*Director of the United States Patent and Trademark Office*